United States Patent
Berman

(10) Patent No.: US 8,075,189 B2
(45) Date of Patent: Dec. 13, 2011

(54) METHOD FOR ATTACHING A SPOUT TO A FLEXIBLE FILM POUCH

(75) Inventor: Ronald H. Berman, Long Beach, CA (US)

(73) Assignee: Bosch Pouch Systems AG, Neuhausen (CH)

( * ) Notice: Subject to any disclaimer, the term of this patent is extended or adjusted under 35 U.S.C. 154(b) by 0 days.

(21) Appl. No.: 11/471,930

(22) Filed: Jun. 21, 2006

(65) Prior Publication Data

US 2007/0297700 A1    Dec. 27, 2007

(51) Int. Cl.
*B65D 33/00* (2006.01)
*B65D 33/16* (2006.01)
*B65D 30/08* (2006.01)

(52) U.S. Cl. ............ 383/202; 383/66; 383/80; 383/116; 383/906

(58) Field of Classification Search .......... 383/66, 383/80, 116, 202, 906
See application file for complete search history.

(56) References Cited

U.S. PATENT DOCUMENTS

| | | | | |
|---|---|---|---|---|
| 5,016,757 A | * | 5/1991 | Chatourel | 383/202 |
| 5,348,184 A | * | 9/1994 | Adams et al. | 220/266 |
| 5,549,389 A | * | 8/1996 | Takagaki et al. | 383/202 |
| 5,851,072 A | * | 12/1998 | LaFleur | 383/66 |
| 2007/0127854 A1 | * | 6/2007 | Smith et al. | 383/66 |

FOREIGN PATENT DOCUMENTS

| | | | |
|---|---|---|---|
| EP | 414992 A1 | * | 3/1991 |
| JP | 9-132271 | | 5/1997 |
| JP | 09132271 A | * | 5/1997 |

OTHER PUBLICATIONS

Supplementary Search Report for Application No. EP 07 79 5891, dated Apr. 29, 2010.

* cited by examiner

*Primary Examiner* — Jes F Pascua
(74) *Attorney, Agent, or Firm* — Fulwider Patton LLP

(57) ABSTRACT

A flexible film pouch includes an aperture to access its contents, and a closure means such as a re-sealable spout is applied over the aperture to permit sealed storage of the contents after opening. The closure means is attached to the flexible film pouch by means of a patch that is bonded to the inside of the pouch adjacent to the aperture. The patch is selected to have a mating surface that bonds with the inner surface of the pouch, where such bonding is preferably conducted by ultrasonic welding or adhesive bonding. The patch itself may have a hole that permits access to the contents of the pouch, or the closure means may include a cutting surface that tears a portion of the patch to permit access.

5 Claims, 4 Drawing Sheets

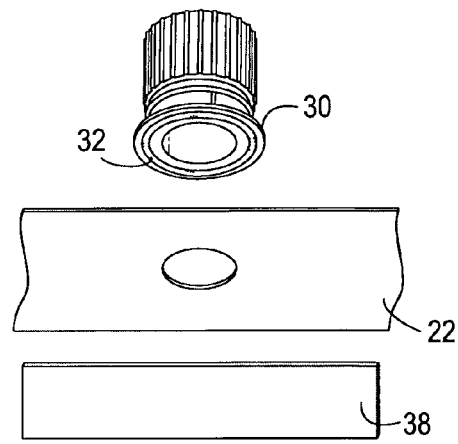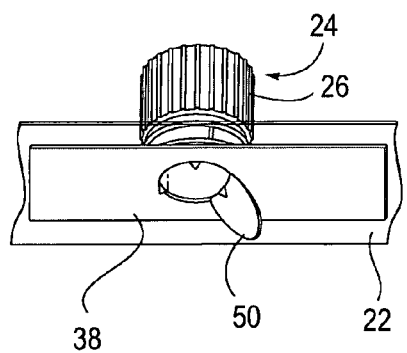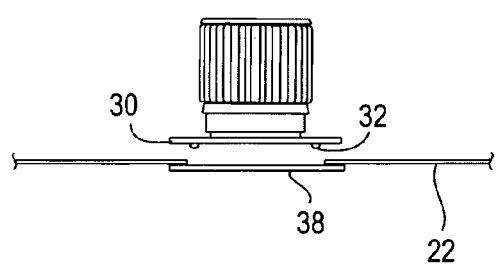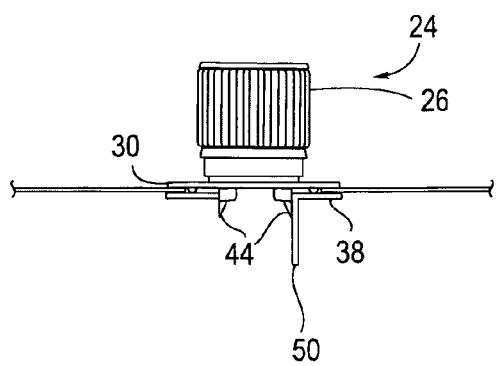
FIG. 5         FIG. 6

METHOD FOR ATTACHING A SPOUT TO A FLEXIBLE FILM POUCH

FIELD OF THE INVENTION

The present invention relates generally to containers referred to as "flexible film pouches," and more particularly refers to a method for affixing a re-closeable spout to a flexible film pouch in order to allow the spout to be used as a means of accessing the contents of the pouch and then resealed to secure the contents of the pouch.

BACKGROUND OF THE INVENTION

Flexible pouches are an attractive alternative to other forms of consumer packaging, including glass or plastic bottles, aluminum cans, and cartons. Pouches have distinctive practical and economic advantages in that they lie flat when empty, thereby requiring less storage space and reducing handling and shipping costs as well as lower costs of bulk waste. Flexible pouches are typically recyclable without processing and can be produced at costs comparable to rigid containers. The appeal of flexible pouches to consumers over rigid containers includes convenience: they are lightweight and easy to fit into small spaces; have a distinctive tactile appeal; and are more friendly to the environment and thus convey a lifestyle image more consistent with that of many consumers. Flexible film pouches also tend to have greater surface areas for displaying graphics and this creates more space for merchandising which further enhances the product, benefiting both suppliers and consumers alike.

Flexible pouches currently used in the packaging industry are comprised of multi-layers of coextruded materials, conventionally between two and ten layers, and more typically from four to six layers. The layers can be made of polyethylene (PE), ethylene vinyl alcohol copolymer (EVOH), metal foil, or polyester (PET), along with a solvent or solvent based adhesive to bind the adjoining layers.

Present art involves pouches that have been designed with a spout welded to the top opening of the pouch body during the process of sealing the pouch closed. Most spouts are made of a high density PE and this material does not readily adhere to other materials of non-similar composition. This makes affixing the spout to the pouch problematic. This is further complicated by difficulties with achieving a leak-proof seal of the spout to the pouch.

In addition to problems with the quality of seal, in some instances the contents of the pouch is filled through the spout opening after it has been attached to the pouch. This methodology is relatively slow, resulting in higher costs of manufacture and packaging. Consequently, spouted pouches can cost more than competing rigid containers requiring them to be priced comparatively higher, and many consumers are unwilling to pay this added cost despite the distinctive design and appeal of the spouted pouch.

Another material which may be used for a spout is polypropylene (PP) but the cost involved in affixing this spout to the body of the pouch is also too high to gain strong consumer interest. As well, the present art for spouts follows a common design, limiting brands owners from achieving differentiation of their products, desired in the overall appearance of their packaging. Moreover, the application of spouts to pouches for other uses aside from beverages, such as liquid foods as well as household products, cosmetics, lotions, and the like are held back by the limited range of spout sizes and lack of suitable and economical means of manufacture. Therefore while demand for pouches with spouts has been growing, spouted pouches have gained limited popularity as a packaging form. The present invention seeks to solve these shortcomings with new opportunities for different spout configurations by employing a different technology to seal the spout to the pouch and apply the spout to the outside of the pouch. These innovations will result in a reliable and low cost method of applying an attractive and practical re-closeable spout to flexible pouches and create new opportunities for spouted pouches to be utilized for a broad range of products, including health and beauty, household, medical, automotive and industrial products as well as low acid beverages, in a range of pouch and spout sizes.

SUMMARY OF THE INVENTION

The shortcomings of the prior art are overcome in the present invention through a combination of the method by which the spout is sealed to the pouch. The sealing method requires a flexible pouch to be manufactured with a patch (or strip) of thin film affixed to the inner surface of the pouch, to which a spout can be reliably attached. The spout, preferably composed of high density PE, is bonded to the patch or strip rather than the pouch body. For example, the pouch may include an external layer of PE and a patch or strip would preferably include a surface of PE that could then be welded to the inner surface of the pouch. In a preferred embodiment, the welding is achieved though ultrasonic bonding, although other types of bonding may be used including bonding utilizing a process of applying heat and adhesives. A section of the pouch is cut away to expose the patch or strip. When the spout flange is sealed to the patch or strip, it is positioned directly over the circular cut away portion of the pouch in order that it can be applied to the exposed patch or strip material. In a first preferred embodiment, the patch or strip also includes an aperture that can be used to fill the pouch as well as provide ready access to the contents when the re-closable spout is opened. When the spout cap is twisted open and removed during its initial use, the contents of the pouch are allowed to flow through the aperture and the spout. In a second preferred embodiment, the patch or strip provides a barrier that seals the pouch until ruptured by a cutting mechanism located at the spout. When the spout cap is twisted to open during its initial use, sharp protruding teeth on a cutting ring are engaged and lower to puncture the patch or strip material, then as the cutting ring turns, the teeth cut through the patch or strip material to create an aperture. The aperture allows the contents of the pouch to flow through the aperture and the pout.

BRIEF DESCRIPTION OF THE DRAWINGS

Other features and advantages of the invention will become apparent from the following detailed description, taken in conjunction with the accompanying drawings which illustrate, by way of example, the features of the invention, wherein:

FIG. 1b is a bottom view of the spout of FIG. 1a;

FIG. 4b is a bottom view of the spout of FIG. 4a;

FIG. 5 is an enlarged, cross-sectional view of the spout, patch, and pouch combination of FIG. 4 prior to attachment of the spout to the patch; and FIG. 6 is an enlarged, cross-sectional view of the spout, patch, and pouch combination of FIG. 5 after attachment of the spout to the patch.

DETAILED DESCRIPTION OF THE PREFERRED EMBODIMENTS

Figure 1A:
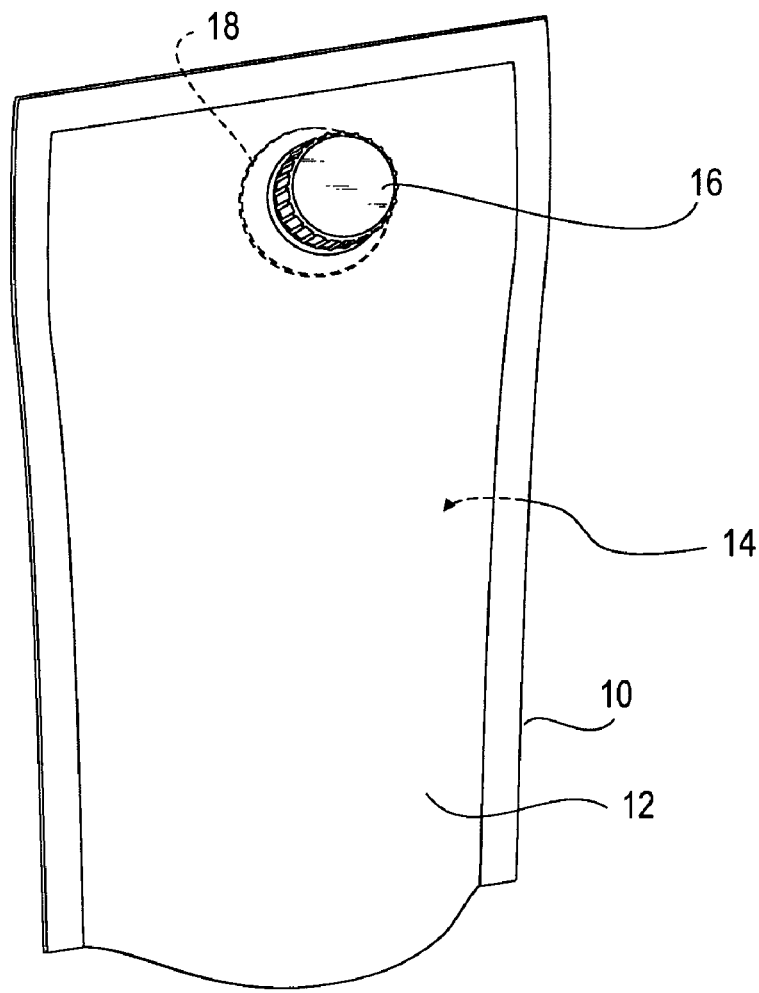
FIG. 1a is a front view, partially in shadow, of a first preferred embodiment of a thin film pouch and spout combination constructed of the method of the present invention.
Figure 1B:
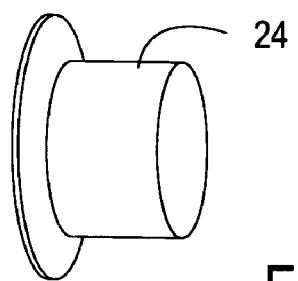

FIG. 1 illustrates a first preferred embodiment of the present invention comprising a pouch 10 having a front wall 12 and a back wall 14 preferably sealed at respective edges to form a fluid-tight reservoir. The pouch may include side panels (not shown) to expand the volume and may further include a bottom portion that also increases the volume of the pouch, although the shape of the pouch and number of panels play no role in the specifics of the present invention.

The front wall 12 and rear wall 14 are preferably made of a multilayer laminate of co-extruded material having between two and ten layers, and more typically four to six layers. The layers can be made of polyethylene (PE), ethylene vinyl alcohol copolymer (EVOH), metal foil, polyester (PET), and solvent or solvent based adhesive to bind the adjoining layers. In order to create an opening in the pouch film whereupon a patch or strip of material will be applied, an aperture 16 is formed in the front wall 12. The aperture 16 will typically be formed in the front wall during formation of the pouch, although the aperture may be cut after the pouch is assembled.

Figure 2:
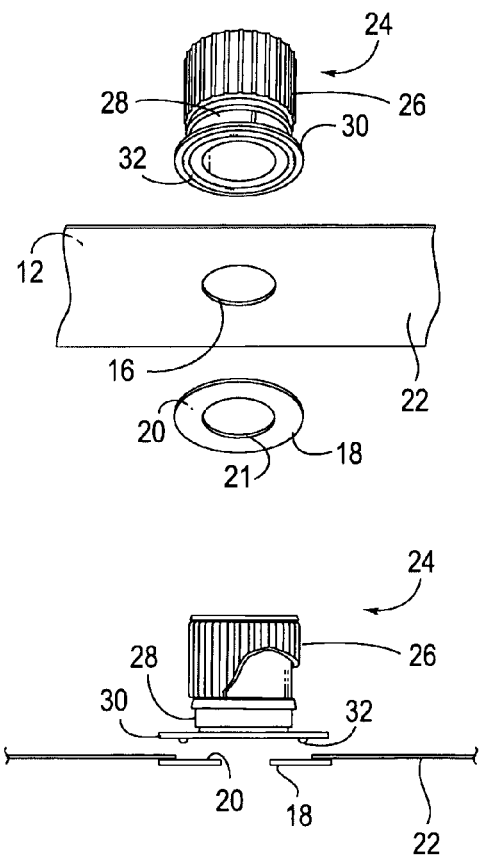
FIG. 2 is an enlarged, cross-sectional view of the spout, patch, and pouch combination of FIG. 1 prior to attachment of the spout to the patch.

Secured to the inside surface of the front wall 12 is a patch 18 selected to bond with the inner surface of the front wall 12. The preferred method of bonding the two mating surfaces between the pouch and the patch 18 is with ultrasonic bonding techniques, although heat and adhesive techniques may also be used. As shown more clearly in FIGS. 2 and 3, the mating surface 20 of the patch 18 that is intended to bond with the inner surface 22 of the front wall 12 is preferably constructed of a like material with the inner surface 22, or at least of a material selected to promote bonding between the two surfaces. The preferred material is PE, although other materials are possible. Using ultrasonic bonding, adhesive bonding, heat welding, or other bonding techniques, the patch 18 is affixed to the inner surface 22 of the pouch 10 such that the patch 18 is behind the aperture 16 and may extend beyond the area defined by the aperture and the patch 18 may be completely hidden by the front wall 12. The patch 18 may include a smaller aperture 21, through which the contents of the pouch 10 are intended to flow.

Figure 3:
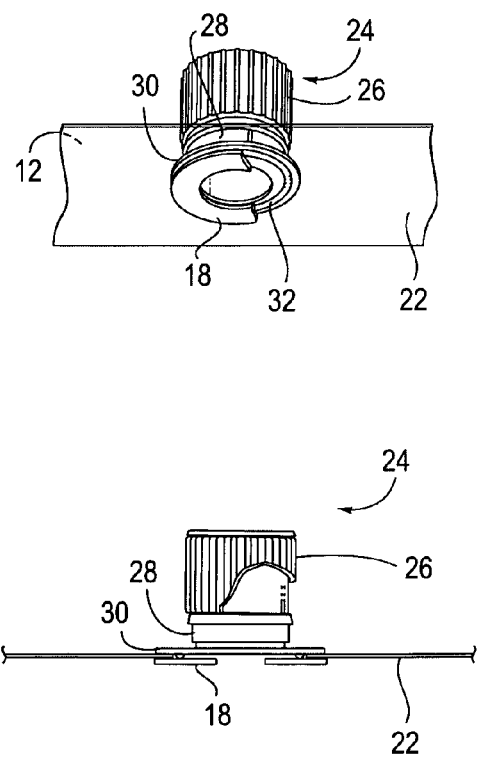
FIG. 3 is an enlarged, cross-sectional view of the spout, patch, and pouch combination of FIG. 1 after attachment of the spout to the patch.

With the patch 18 in place bonded to the front wall 12 of the pouch 10, a closure means of the same material as the patch can then be affixed thereto. For example, a spout unit 24 can be directly affixed to the patch 18 to provide a re-sealable closure means that also serves as a pouring spout. The spout unit 24 may be comprised of a threaded cap 26 that cooperates with a threaded spout 29 that has at its base, a flange 28, although a snap-on cap or pull-spout such as those used on sports drink bottles may also be used. The flange 28 preferably includes a substantially flat annular base 30 with an integrally formed, downwardly projecting ring portion 32 that forms the contact point for the flange 28 to bond with the patch as shown in FIG. 3. With the flange 28 bonded to the patch 18 at the ring portion 32, the threaded cap 26 can be opened in order to evacuate the contents of the pouch and closed on the threaded spout to seal the spout unit and therefore secure the contents within the pouch.

Figure 4A:
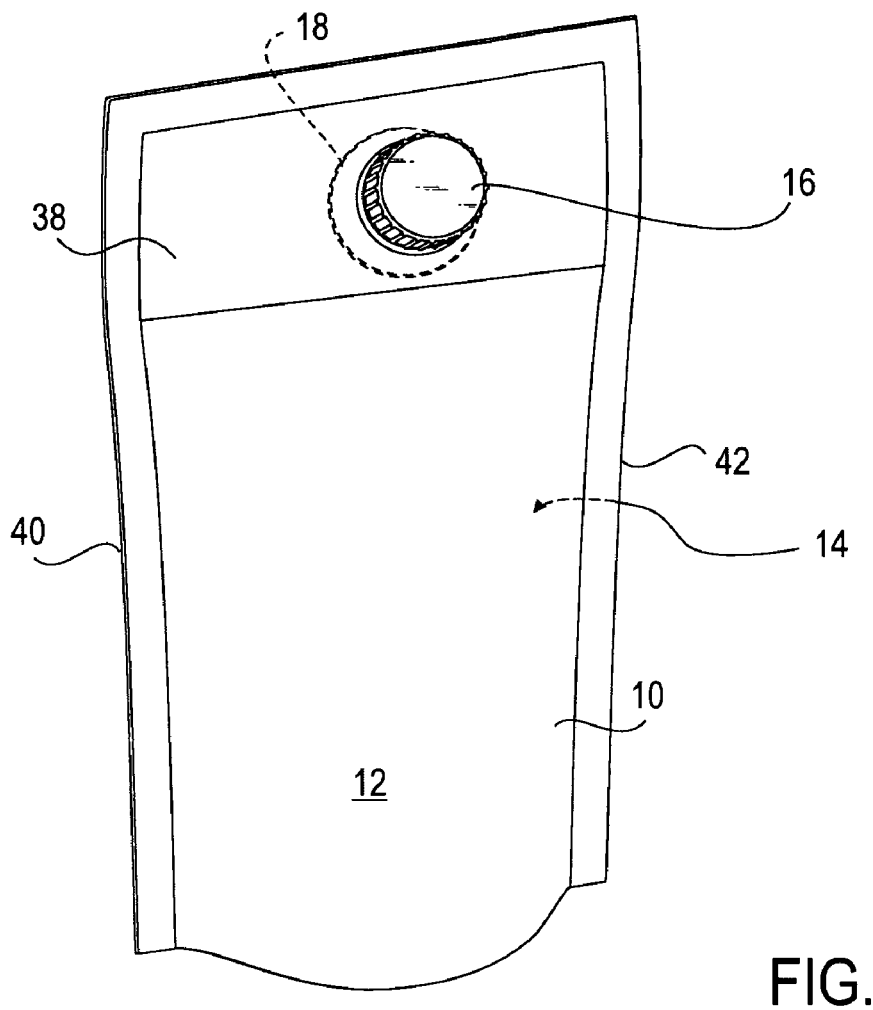
FIG. 4a is a front view, partially in shadow, of a second preferred embodiment of a thin film pouch and spout combination constructed of the method of the present invention.
Figure 4B:
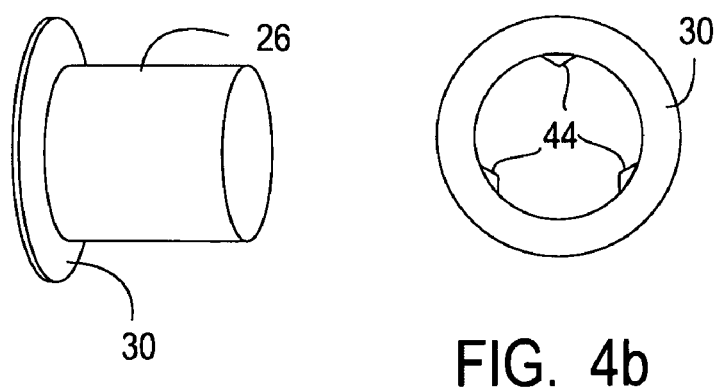

FIG. 4 illustrates a second or alternative embodiment of the present invention where the patch 38 may comprise a rectangular strip of material that extends from one edge 40 of the pouch to the opposite edge 42, and may be attached at the welds of the front wall 12 and rear wall 14. Unlike the previous embodiment, the patch 38 does not include a hole but rather is continuous across the aperture 16. When the closure means such as spout unit 24 is bonded to the patch 38 as discussed above, the integrity of the pouch is not breached and the pouch remains intact. In this embodiment, the spout unit 24 is equipped with cutting teeth 44 (see FIG. 4b) on the lower portion of the spout cap 26 that project radially inwardly and/or downwardly below the surface of the annular base 30. The spout 24 may be equipped with a spacer ring (not shown) that is discarded when the pouch is ready to open so that the cap can be pressed to bear against the patch 38 when the spacer ring is removed. By twisting the spout cap 26 against the patch 38, the cutting teeth 44 tear the patch surface to open the pouch and allow access to its contents. The tear in the patch 38 can be sealed by closing the spout cap 26 against the flange 28 in the manner described above, thus allowing the pouch 10 to be resealed over and over.

FIGS. 5 and 6 illustrate the connection of the second preferred embodiment, where the teeth 44 on the cutting ring are shown rupturing the patch 38 to create a patch flap 50 directed inwardly toward the pouch's interior. It is to be understood that the patch 18 of the first embodiment or patch 38 of the second embodiment can be used with or without cutting teeth 44, and the cutting teeth 44 can be used with either patch configuration. In addition to other types of closure means discussed above, the mode of cutting or tearing the patch is not determinant of the second embodiment of the present invention and the description of cutting teeth are meant to be illustrative only. Perforations, pull-tabs, and other means of creating an opening in the pouch are considered within the scope of the invention.

I claim:

1. A re-sealable thin film pouch comprising:
    a laminate pouch having a front wall and a back wall defining an interior volume therebetween, said front wall having an inner surface of a first material and an outer surface of a second material, and an aperture providing access to said interior volume;
    a patch having a bonding surface formed of said first material, said patch bonded to said front wall at said inner surface, said aperture being totally sealingly closed by said patch; and
    a spout for re-sealably closing the aperture in said front wall where said spout is bonded only to said patch through said aperture and not said pouch; said spout having a flange with an annular base with an inner diameter smaller than said aperture in the laminate pouch, the annular base affixed to an outer surface of the patch;
    a cutting member arranged in said spout comprising a piercing tooth for opening the patch; and
    a cap arranged on said spout with a member to rotate said cutting member about a longitudinal axis of said cap.

2. The re-sealable thin film pouch of claim 1 wherein said patch is bonded to said front wall ultrasonically.

3. The re-sealable thin film pouch of claim 1 wherein said patch is circular and is bonded proximal of said aperture.

4. The re-sealable thin film pouch of claim 1 wherein said patch is an elongate strip and is bonded to said inner surface of said front wall distal of said aperture.

5. A re-sealable thin film pouch comprising:
a laminate pouch having a front wall and a back wall defining an interior volume therebetween, said front wall having an inner surface of a first material and an outer surface of a second material, and a first aperture providing access to said interior volume;
a patch having a bonding surface formed of said first material, said patch bonded to said front wall at said inner surface, said patch having a second aperture smaller in diameter than a diameter of the first aperture in said wall;
a spout for re-sealably closing the second aperture in said patch; and
an annular ring on said spout with a diameter smaller than the diameter of the first aperture but larger than the second aperture; and
a cap arranged on said spout with a cutting member rotatable about a longitudinal axis of said cap.

* * * * *